(12) United States Patent
Nitta (10) Patent No.: US 12,511,514 B2
(45) Date of Patent: Dec. 30, 2025

(54) RFID MEDIUM AND RFID MEDIUM CONTINUOUS BODY

(71) Applicant: SATO HOLDINGS KABUSHIKI KAISHA, Tokyo (JP)

(72) Inventor: Haruhiko Nitta, Minato-ku (JP)

(73) Assignee: SATO CORPORATION, Tokyo (JP)

( * ) Notice: Subject to any disclaimer, the term of this patent is extended or adjusted under 35 U.S.C. 154(b) by 0 days.

(21) Appl. No.: 18/686,770

(22) PCT Filed: Aug. 23, 2022

(86) PCT No.: PCT/JP2022/031712
§ 371 (c)(1),
(2) Date: Feb. 26, 2024

(87) PCT Pub. No.: WO2023/032756
PCT Pub. Date: Mar. 9, 2023

(65) Prior Publication Data
US 2024/0378410 A1    Nov. 14, 2024

(30) Foreign Application Priority Data

Sep. 3, 2021 (JP) ................... 2021-143958

(51) Int. Cl.
*G06K 19/077* (2006.01)

(52) U.S. Cl.
CPC ... *G06K 19/07773* (2013.01); *G06K 19/0776* (2013.01)

(58) Field of Classification Search
CPC .............. G06K 19/07773; G06K 19/0776
USPC ........................................ 235/492
See application file for complete search history.

(56) References Cited

U.S. PATENT DOCUMENTS

| | | | |
|---|---|---|---|
| 12,260,280 B2 | 3/2025 | Maeda et al. | |
| 2005/0021172 A1* | 1/2005 | Winter | G06K 19/077 156/64 |
| 2006/0063671 A1 | 3/2006 | Kutami et al. | |
| 2006/0065738 A1 | 3/2006 | Versic et al. | |
| 2006/0125641 A1* | 6/2006 | Forster | G06K 19/07749 29/601 |
| 2006/0214802 A1* | 9/2006 | Posamentier | G06K 19/07327 340/572.1 |
| 2013/0225402 A1 | 8/2013 | Tatewaki et al. | |
| 2016/0176215 A1* | 6/2016 | Roth | B41M 5/41 503/209 |

(Continued)

FOREIGN PATENT DOCUMENTS

| | | |
|---|---|---|
| CN | 110964460 A | 4/2020 |
| CN | 111860735 A | 10/2020 |

(Continued)

OTHER PUBLICATIONS

Extended European Search Report issued in EP Appl. No. 21923117.2 dated Jun. 10, 2024.

*Primary Examiner* — Allyson N Trail
(74) *Attorney, Agent, or Firm* — Foley & Lardner LLP (57) ABSTRACT

An RFID medium including: a base material, a thermosensitive color-developing layer formed on a front surface of the base material and developed a color by heat, an antenna formed on a rear surface of the base material, and an IC chip connected to the antenna, in which the antenna and the IC chip are connected to each other by a conductive material that is cured by an ultraviolet ray.

13 Claims, 11 Drawing Sheets

(56) References Cited

U.S. PATENT DOCUMENTS

| | | | |
|---|---|---|---|
| 2016/0290871 A1* | 10/2016 | Kozono | G01K 1/02 |
| 2017/0337852 A1* | 11/2017 | Oster | B32B 7/12 |
| 2019/0302018 A1* | 10/2019 | Oda | G01N 21/55 |
| 2020/0302261 A1 | 9/2020 | Maeda | |
| 2020/0334511 A1* | 10/2020 | Schoening | G06K 19/07722 |
| 2021/0201104 A1 | 7/2021 | Osborn et al. | |
| 2023/0019546 A1 | 1/2023 | Maeda | |
| 2023/0334281 A1* | 10/2023 | Finn | G06K 19/07794 |

FOREIGN PATENT DOCUMENTS

| | | |
|---|---|---|
| JP | 2008-097321 A | 4/2008 |
| JP | 2014-059694 A | 4/2014 |
| JP | 2017-013292 A | 1/2017 |
| JP | 2020-181478 A | 11/2020 |
| WO | WO-2017/159222 A1 | 9/2017 |
| WO | WO-2021/132613 A1 | 7/2021 |

\* cited by examiner

RFID MEDIUM AND RFID MEDIUM CONTINUOUS BODY

TECHNICAL FIELD

The present invention relates to an RFID medium and an RFID medium continuous body.

BACKGROUND ART

In the fields of manufacture, physical distribution, sales, and the like of products, information related to the products and information for managing the products are visually printed on labels or tags and used integrally with the products. For this purpose, as an example, a label including a thermosensitive color-developing layer that develops color by heat and a thermosensitive printer (also referred to as a thermal printer) for printing on the label are used.

In addition, as referred to in JP2008-97321A, RFID media such as RFID labels and RFID tags corresponding to a radio frequency identification (RFID) technique for transmitting and receiving information by non-contact communication are widely used. According to the RFID media, it is possible not only to visually print the above-described information, but also to store the information in a built-in IC chip.

A base material including the thermosensitive color-developing layer is easily affected by heat. Therefore, in a case where a manufacturing process of the RFID media includes a process involving heat (thermal process), a method of laminating a thermosensitive color-developing layer after the thermal process is adopted in order to avoid heat transfer to the base material.

In particular, in a case of an RFID label accompanied by heat when an IC chip is connected to an antenna, a method is adopted in which an RFID inlay including the antenna and the IC chip is manufactured in advance, and a base material including a thermosensitive color-developing layer is laminated on the RFID inlay.

SUMMARY OF INVENTION

In recent years, there has been an increasing need for RFID media such as RFID labels and RFID tags, and in particular, an application range can be further expanded by making the RFID media capable of execute printing by a general-purpose thermosensitive printer.

However, in RFID media requiring an RFID inlay, the application range may be limited from the viewpoint of a laminated structure and physical properties of an inlay base material. Therefore, further improvement of the RFID media has been desired.

Therefore, an object of the present invention is to simplify a structure of an RFID medium including a base material provided with a thermosensitive color-developing layer.

According to an embodiment of the present invention, there is provided an RFID medium including: a base material, a thermosensitive color-developing layer formed on a front surface of the base material and developed a color by heat, an antenna formed on a rear surface of the base material, and an IC chip connected to the antenna, in which the antenna and the IC chip are connected to each other by a conductive material that is cured by ultraviolet light.

According to an embodiment of the present invention, the RFID medium includes the antenna on the rear surface of the base material provided with the thermosensitive color-developing layer, and the antenna and the IC chip are connected to each other by the conductive material that is cured by ultraviolet light. Therefore, in a process of mounting the antenna and the IC chip on the base material, heat is not applied to the base material provided with the thermosensitive color-developing layer.

Further, in the RFID medium, the antenna and the IC chip are directly formed on the base material provided with the thermosensitive color-developing layer. Therefore, there is no need for an RFID inlay which has been manufactured in advance in order to avoid heat transfer to the base material. Accordingly, the structure of the RFID medium including the base material provided with the thermosensitive color-developing layer can be simplified.

DESCRIPTION OF EMBODIMENTS

Hereinafter, embodiments of the present invention will be described with reference to the drawings.

In the present embodiment, an RFID medium refers to a medium in which an antenna pattern and an IC chip corresponding to a radio frequency identification (RFID) technique for transmitting and receiving information by non-contact communication are incorporated, information related to an article is stored in the IC chip, and printing is executed in a visible manner, and the RFID medium includes an RFID tag used by being attached to an article, or an RFID label used by being attached to an article. In addition, the RFID medium also includes a card, a wrist band, or the like in which the antenna pattern and the IC chip of the RFID specification are incorporated.

[Configuration of RFID Label]

Hereinafter, an RFID label 1 used by being attached to an article as an example of the RFID medium will be described.

Figure 1:
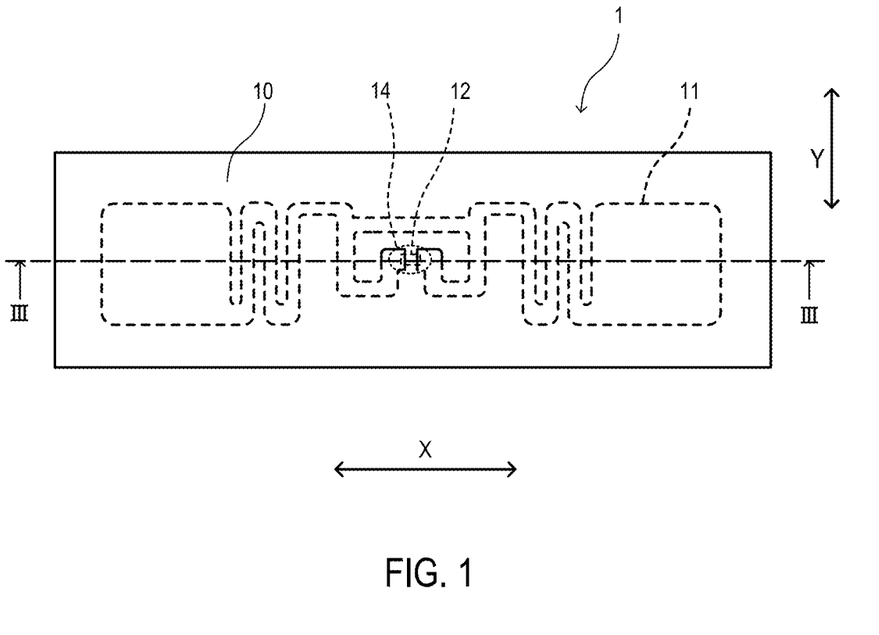
FIG. 1 is a plan view of an RFID label according to an embodiment of the present invention as viewed from a front surface side.
Figure 2:
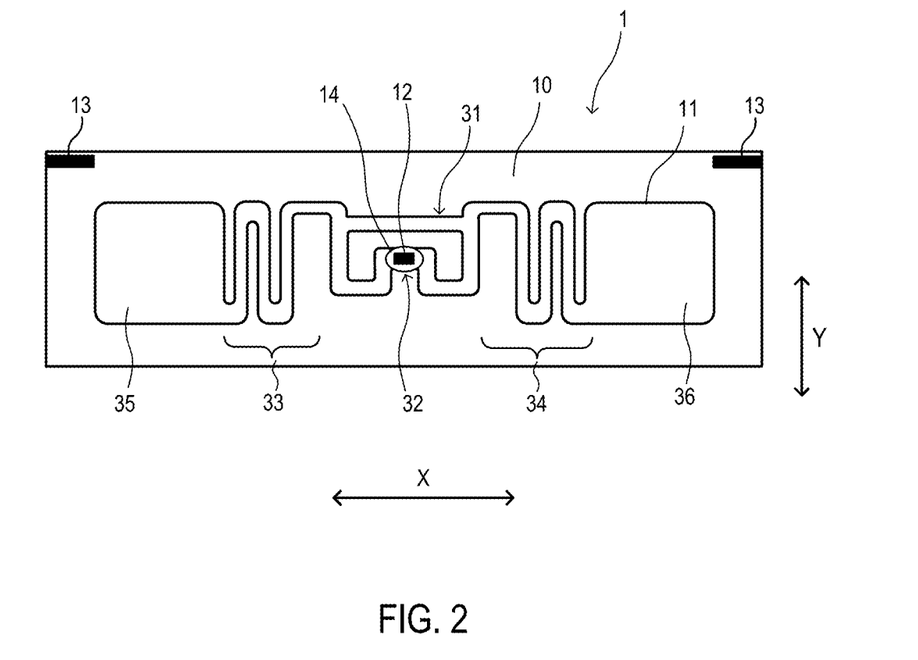
FIG. 2 is a plan view of the RFID label according to the present embodiment as viewed from a rear surface side.
Figure 3:
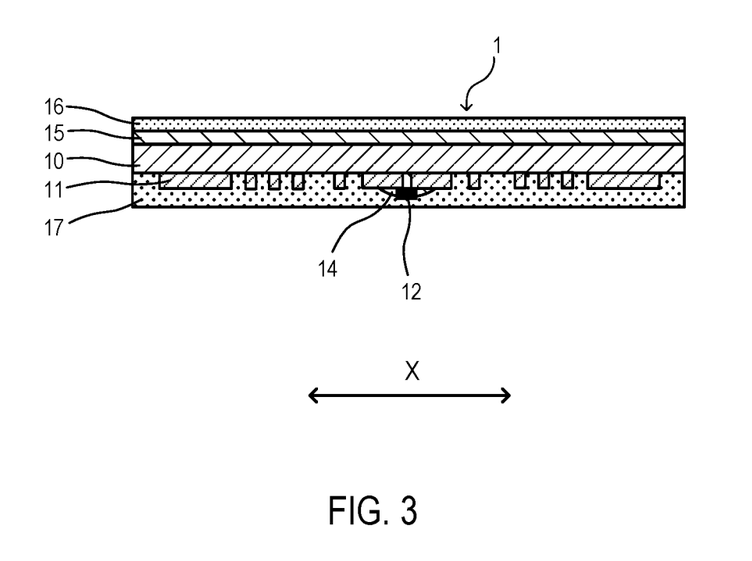
FIG. 3 is a cross-sectional view taken along a line III-III in FIG. 1.

FIG. 1 is a plan view of the RFID label 1 according to an embodiment of the present invention as viewed from a front surface side. FIG. 2 is a plan view of the RFID label 1 according to the present embodiment as viewed from a rear surface side. FIG. 3 is a cross-sectional view taken along a line III-III in FIG. 1.

In the present embodiment, an X direction illustrated in FIGS. 1 to 3 is referred to as a "label width direction". In addition, a Y direction intersecting the X direction is referred to as a "label pitch direction".

The RFID label 1 includes a base material 10, an antenna 11 formed in a predetermined pattern on one surface of the base material, and an IC chip 12 connected to the antenna 11. In the present embodiment, the antenna 11 and the IC chip 12 are connected to each other by an anisotropic conductive material 14 that is cured by ultraviolet light.

As illustrated in FIG. 2, on the base material 10, marks 13 are printed on both end portions of the base material 10 in the label width direction on a surface on which the antenna 11 is formed. The marks 13 are used to detect the RFID label 1 by an optical sensor or the like provided in a printer when the printer executes printing on the RFID label 1.

As illustrated in FIG. 3, on the base material 10, a thermosensitive color-developing layer 15 that develops color by heat is formed on a surface opposite to the surface on which the antenna 11 is formed. Although not illustrated, the thermosensitive color-developing layer 15 includes an undercoat layer, a thermosensitive layer, an overcoat layer, and the like in order from a base material 10 side, and forms a printing surface on which printing can be executed by a printer including a so-called direct thermal printing head.

In the present embodiment, of the base material 10, a surface side on which the thermosensitive color-developing layer 15 is formed is referred to as a front surface side of the RFID label 1, and a surface side on which the antenna 11 is formed is referred to as a rear surface side of the RFID label 1.

In the RFID label 1, a front surface of the thermosensitive color-developing layer 15 is subjected to a release treatment for making it difficult to attach an adhesive. As an example of the release treatment, a release agent such as silicone is applied in the present embodiment. That is, a release layer 16 formed of a release agent is formed on the front surface of the thermosensitive color-developing layer 15.

An adhesive portion 17 for attaching the RFID label 1 to an adherend is formed on the surface of the base material 10 on which the antenna 11 is formed.

In the present embodiment, the adhesive portion 17 is formed by an adhesive laminated on the surface of the base material 10 on which the antenna 11 is formed.

Next, each part constituting the RFID label 1 will be described.

As a material applicable as the base material 10, a paper base material such as thick paper, high-quality paper, medium-quality paper, or coated paper obtained by forming a coating layer on those paper can be used.

A thickness of the base material 10 can be 10 μm or more and 300 μm or less when applied to the RFID label 1.

In a case where the base material 10 is a paper base material, within the above-mentioned range, a paper base material having a thickness of 50 μm or more and 260 μm or less can be used, and in particular, a paper base material having a thickness of 80 μm can be used.

In addition, in the present embodiment, in addition to the above-mentioned paper base material, a single-layer resin sheet formed of a single resin such as polyvinyl chloride, polyethylene terephthalate, polypropylene, polyethylene, and polyethylene naphthalate, or a multilayer resin sheet obtained by laminating a plurality of these single-layer sheets can be used.

In a case where the base material 10 is a resin sheet, within the above-mentioned range, a resin sheet having a thickness of 25 μm or more and 200 μm or less, particularly 10 μm or more and 200 μm or less can be used.

The material and the thickness of the base material 10 described above can be appropriately selected in the above-mentioned range depending on an intended use.

The antenna 11 is formed in the RFID label 1 over the X direction illustrated in FIGS. 1 to 3. The antenna 11 can be formed by a conductive sheet containing a conductive material. As the conductive sheet, a metal foil can be used, and in particular, a sheet of aluminum or copper can be used.

In the present embodiment, as illustrated in FIG. 2, the antenna 11 includes a loop portion 31, an IC chip connection portion 32 on which the IC chip 12 is mounted, meanders 33 and 34 extending symmetrically in a width direction (X direction) of the label from the loop portion 31, and capacitor hats 35 and 36 connected to end portions of the meanders 33 and 34.

In the present embodiment, the antenna 11 is, for example, a UHF band RFID antenna designed to have an antenna length and an antenna line width corresponding to a UHF band (300 MHz to 3 GHz, particularly 860 MHz to 960 MHz).

In addition, the antenna 11 may be designed in a pattern corresponding to a specific frequency band such as a microwave (1 GHz to 30 GHz, particularly around 2.4 GHz) and an HF band (3 MHz to 30 MHZ, particularly around 13.56 MHz) according to the RFID specification.

A thickness of a metal foil on which the antenna 11 can be formed can be set in consideration of a thickness of the RFID label 1, manufacturing cost, and the like, and is preferably 3 μm or more and 50 μm or less. In the present embodiment, it is preferable to use an aluminum foil having a thickness of 7 μm as an example from the viewpoint of suppressing the manufacturing cost.

Although not illustrated in the drawings, the antenna 11 is bonded to the base material 10 by an adhesive layer for lamination formed of, for example, acrylic-based, urethane-based, silicone-based, or rubber-based adhesive or bonding agent.

The IC chip 12 is a semiconductor package designed to be able to communicate with a reading device (not illustrated) or a printer including the reading device.

The IC chip 12 is electrically and mechanically connected to the IC chip connection portion 32 provided in a part of the loop portion 31 of the antenna 11 by the anisotropic conductive material 14 that is cured by ultraviolet light.

Effects

The RFID label 1 includes the antenna 11 on the rear surface of the base material 10 provided with the thermosensitive color-developing layer 15, and the antenna 11 and the IC chip 12 are connected to each other by the anisotropic conductive material 14 that is cured by ultraviolet light. That is, the antenna 11 and the IC chip 12 can be directly mounted on the base material 10 provided with the thermosensitive color-developing layer 15 without a heating process.

Therefore, in the manufacturing process of the RFID label in the related art, there is no need for an RFID inlay which has been manufactured in advance in order to avoid heat transfer to the base material provided with the thermosensitive color-developing layer. Accordingly, a structure of the RFID label including the base material provided with the thermosensitive color-developing layer can be simplified.

In addition, in the RFID label 1, since the release layer 16 is formed on the front surface of the thermosensitive color-developing layer 15, even in a case where a plurality of RFID labels 1 are overlapped and the adhesive portion 17 formed on the rear surface of the RFID label 1 is attached to a front surface of the RFID label 1, the RFID labels 1 can be easily peeled off from each other.

Therefore, the RFID label 1 does not require a separator covering the adhesive portion 17 in order to prevent the adhesive portion 17 from being attached unnecessarily in a state before being attached to the adherend.

[Modification of RFID Label]

Figure 4:
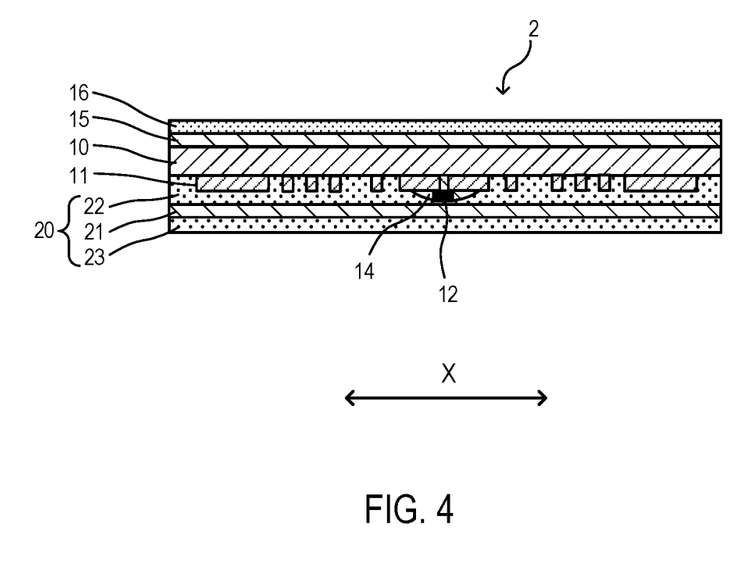
FIG. 4 is a cross-sectional view illustrating an RFID label illustrated as a modification.

Next, a modification of the RFID label will be described. FIG. 4 is a cross-sectional view illustrating an RFID label 2 illustrated as the modification.

An RFID label 2 includes a tack material 20 instead of the adhesive portion 17 of the RFID label 1.

The tack material 20 includes a tack base material 21 and adhesive layers 22 and 23 laminated on both surfaces of the tack base material 21.

The tack material 20 is attached to the base material 10 with the adhesive layer 22 facing the surface of the base material 10 on which the antenna 11 is formed. Accordingly, the adhesive layer 23 functions as an adhesive portion to the adherend.

In addition, by using the tack material 20, there is no need to perform a process of laminating the adhesive portion on the base material 10 continuously to a series of processes of mounting the antenna 11 and the IC chip 12 on the base material 10.

In a handling stage before the RFID label 2 is attached to the adherend, in order to prevent the base material 10 and the tack material 20 from separating from each other, for example, it is preferable to set the adhesive layer 22 to be attached to the base material 10 to a strongly adhesive state and set the adhesive layer 23 to be attached to the adherend to a lower adhesive strength than that of the adhesive layer 22.

[RFID Label Continuous Body]

Next, the RFID medium continuous body will be described.

The RFID medium continuous body includes a plurality of RFID media, and the respective RFID media are connected to each other on a separation portion. In the present embodiment, an RFID label continuous body 100 to which the RFID label 1 is connected will be described as an example of the RFID medium continuous body.

Figure 5:
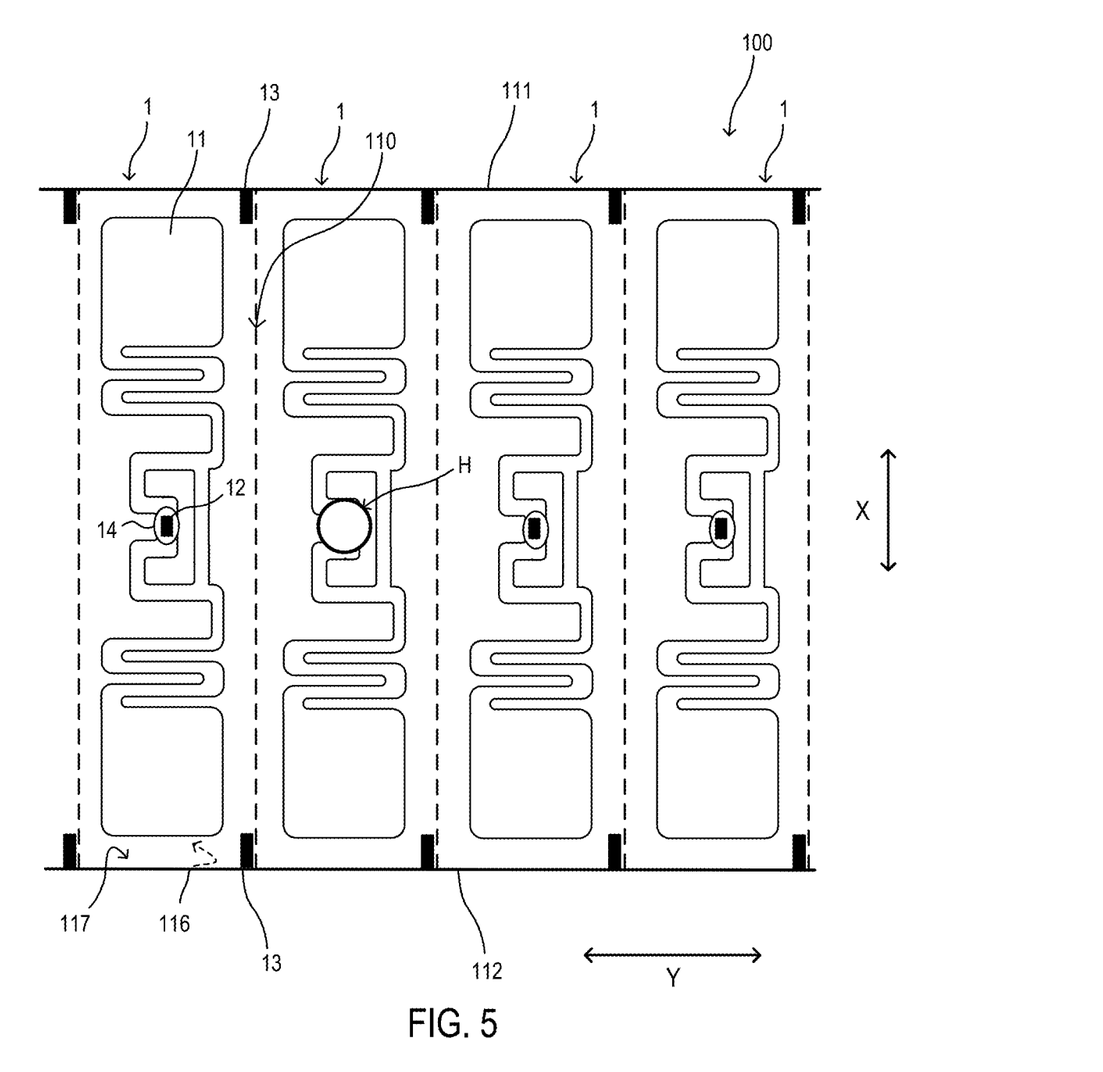
FIG. 5 is a plan view of an RFID label continuous body according to the present embodiment as viewed from the rear surface side.

FIG. 5 is a plan view of the RFID label continuous body 100 according to the present embodiment as viewed from the rear surface side.

In the RFID label continuous body 100, a plurality of RFID labels 1 are connected to each other via a separation portion 110. The respective RFID labels 1 are connected to each other in the label pitch direction (Y direction) of the RFID label 1.

In FIG. 5, the width direction (X direction) of the RFID label 1 corresponds to a width direction of the RFID label continuous body 100, and the label pitch direction (Y direction) corresponds to a longitudinal direction of the RFID label continuous body 100.

In the RFID label continuous body 100, a plurality of marks 13 are printed on side edge portions 111 and 112. Each of the plurality of marks 13 is formed at an interval corresponding to a length (hereinafter, referred to as a pitch) of the RFID label 1 in the label pitch direction.

In the present embodiment, a release layer 116 is formed on a front surface of the RFID label continuous body 100. An adhesive portion 117 serving as the adhesive portion 17 of each RFID label 1 is formed on a rear surface of the RFID label continuous body 100.

The marks 13 are used to detect each of the RFID labels 1 by an optical sensor or the like provided in a printer when the printer executes printing on the RFID label continuous body 100. In the present embodiment, the mark 13 is printed in advance at a position corresponding to a perforation formed as the separation portion 110, in the present embodiment, adjacent to the perforation.

The mark 13 is printed on the base material 10 before a process of forming the antenna 11 on the base material 10 or after a process of forming the antenna 11 on the base material 10 and before the adhesive portion 117 is formed.

When the mark 13 is formed near a boundary between the RFID labels 1, the printer can easily measure the boundary between the RFID labels 1 and a printing region on the RFID label 1 based on the mark 13.

In addition, in the present embodiment, the separation portion 110 is a perforation formed along the width direction (X direction) of the RFID label continuous body 100. Accordingly, the RFID labels 1 can be easily separated at the separation portion 110.

In the present embodiment, after the adhesive portion 117 is formed in the RFID label continuous body 100, a perforation is formed as the separation portion 110.

As illustrated in FIG. 5, in the present embodiment, a region including the IC chip 12 is cut out in some of the RFID labels 1 to form an opening H. By the opening H, an IC chip 12 in which a defect is found (hereinafter, referred to as a defective chip) can be removed in an inspection process or the like when the RFID label continuous body 100 is manufactured.

Since the RFID labels 1 in which the opening H is formed do not include the IC chip 12, reading cannot be executed by a printer including a reading device of the IC chip 12. As a result, the printer can avoid printing on the RFID labels 1 in which the IC chip 12 cannot be read.

Accordingly, it is possible to prevent erroneously printing from being executed on the RFID label 1 including the defective chip and prevent the RFID label 1 from being used.

Figure 6:
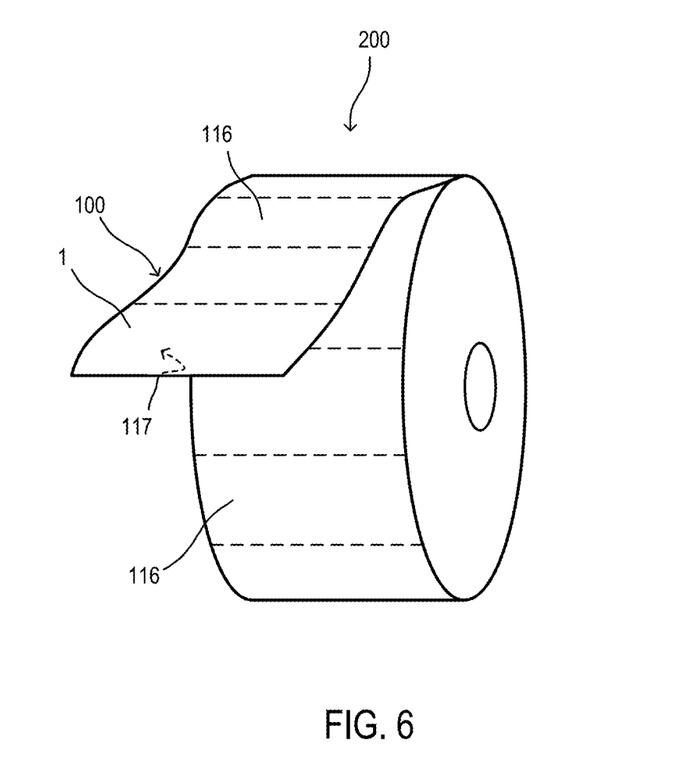
FIG. 6 is a schematic view illustrating a label roll around which the RFID label continuous body is wound.

FIG. 6 is a schematic view illustrating a label roll 200 around which the RFID label continuous body 100 is wound.

In the present embodiment, since the release layer 116 is formed on the front surface of the RFID label continuous body 100, when the RFID label continuous body 100 is wound, the adhesive portion 117 can be easily peeled off even when the adhesive portion 117 formed on the rear surface is attached to the front surface. Therefore, the RFID label continuous body 100 can be provided as the label roll 200 without using a separator temporarily attached to the adhesive portion 117.

[First Modification of RFID Label Continuous Body]

Figure 7:
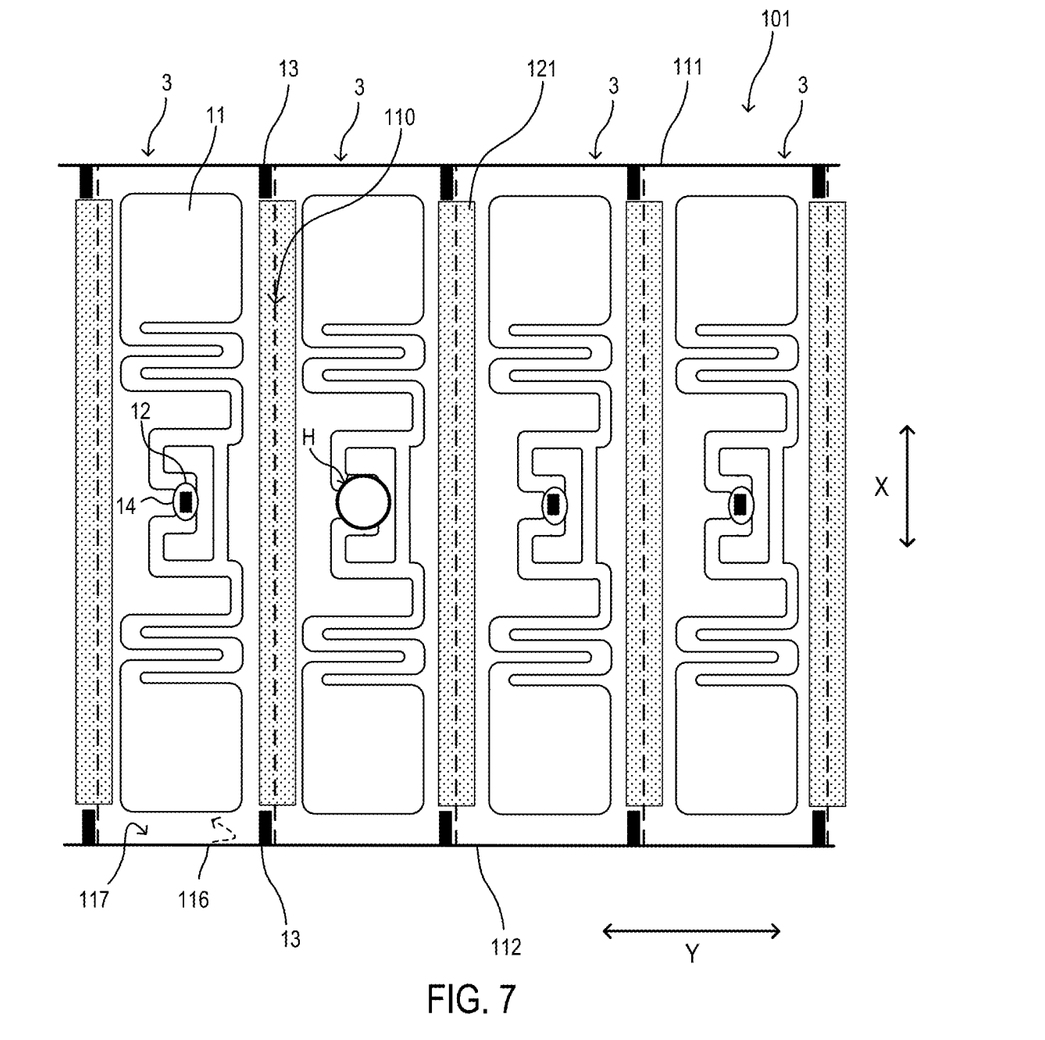
FIG. 7 is a plan view of an RFID label continuous body illustrated as a first modification as viewed from the rear surface side.

FIG. 7 is a plan view of an RFID label continuous body 101 illustrated as a first modification as viewed from the rear surface side.

An RFID label 3 is obtained by separating the RFID label continuous body 101 at the separation portion 110.

On a rear surface of the RFID label continuous body 101, the adhesive portion 117 serving as the adhesive portion 17 of each RFID label 3 is formed.

In addition, a non-adhesive portion 121 is formed in a region including the separation portion 110. The non-adhesive portion 121 is a region subjected to processing for eliminating adhesiveness of the adhesive portion 117, and is coated with silicone as an example in the present embodiment.

Figure 8:
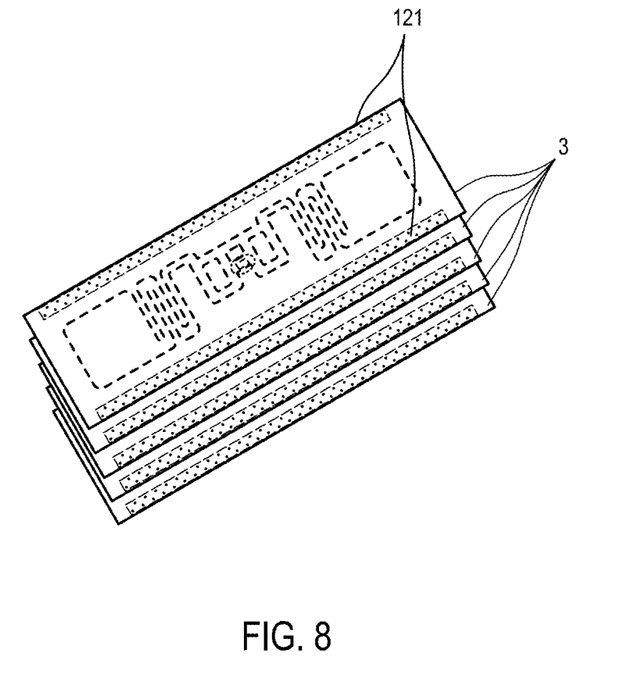
FIG. 8 is a schematic view illustrating a state in which RFID labels obtained by being separated from the RFID label continuous body illustrated as the first modification are overlapped.

FIG. 8 is a schematic view illustrating a state in which RFID labels 3 obtained by being separated from the RFID label continuous body 101 are overlapped. In FIG. 8, non-adhesive portions 121 represented by dots on a front surface side of the RFID label 3 are described for illustration, and are formed on a rear surface side of the RFID label 3 in the embodiment.

In the RFID label continuous body 101, the non-adhesive portions 121 are formed in the region including the separation portion 110. Therefore, the non-adhesive portions 121 are formed on both opposite side edges of the RFID label 3 obtained by being separated from the RFID label continuous body 101.

As illustrated in FIG. 8, even in a case where a plurality of RFID labels 3 are overlapped with each other, since the side edges of the RFID labels 3 are not attached to the overlapped RFID labels 3, a user can easily lift and peel off the side edges of the RFID labels 3. Accordingly, it is possible to improve the handleability of the RFID label 3 until the RFID label 3 is separated from the RFID label continuous body 101 and attached to the adherend.

[Second Modification of RFID Label Continuous Body]

Figure 9:
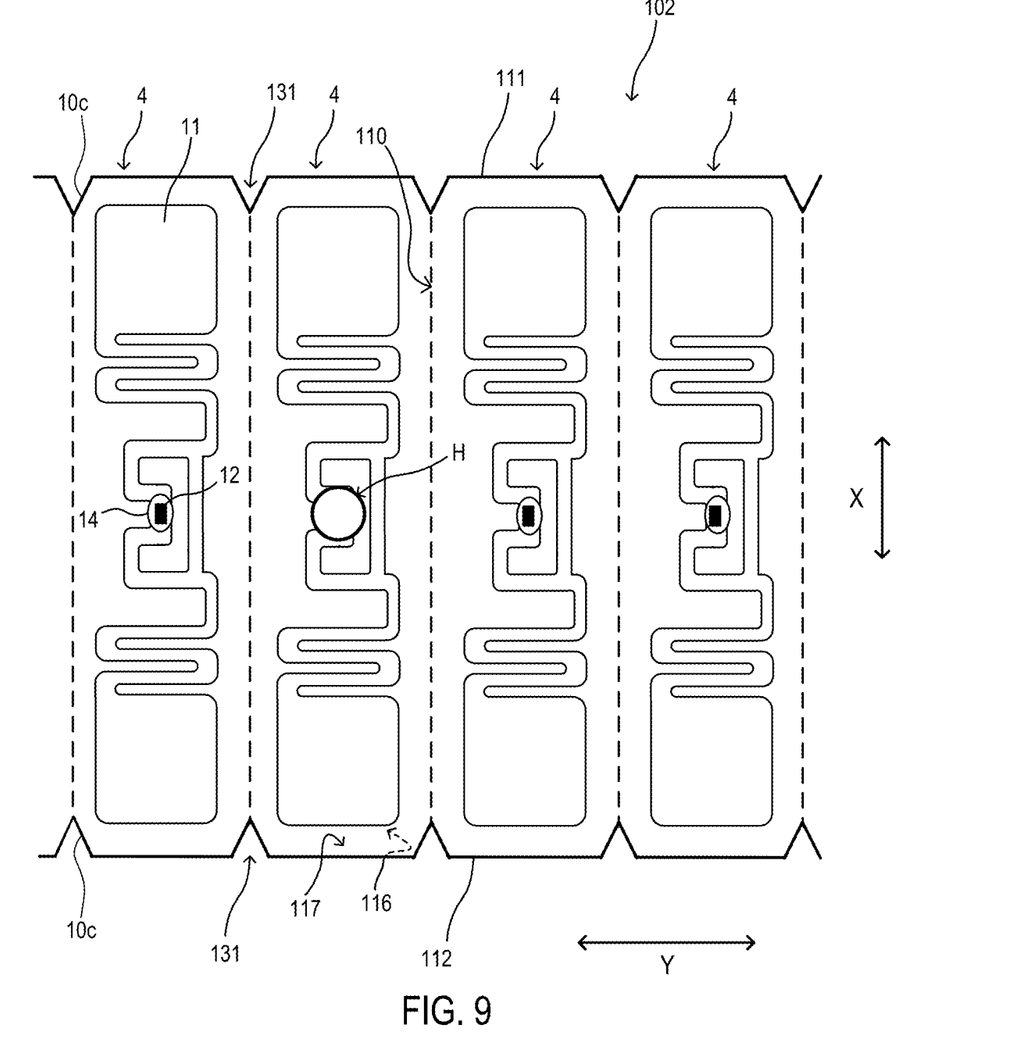
FIG. 9 is a plan view of an RFID label continuous body illustrated as a second modification as viewed from the rear surface side.

FIG. 9 is a plan view of an RFID label continuous body 102 illustrated as a second modification as viewed from the rear surface side.

An RFID label 4 is obtained by separating the RFID label continuous body 102 at the separation portion 110.

A plurality of notch portions 131 cut inward in a width direction of the RFID label continuous body 102 are formed in the side edge portions 111 and 112 facing each other in the width direction of the RFID label continuous body 102. Each of the plurality of notch portions 131 is formed at an interval corresponding to a pitch of the RFID label 4.

In the present embodiment, the release layer 116 is formed on the entire front surface of the RFID label continuous body 102. In addition, the adhesive portion 117 corresponding to the adhesive portion 17 of each RFID label 1 is formed on the entire rear surface of the RFID label continuous body 102.

The notch portions 131 are used to detect each RFID label 1 by an optical sensor or the like provided in a printer when the printer executes printing on the RFID label continuous body 102.

In the present embodiment, the notch portion 131 is formed at a position corresponding to the separation portion 110. When the notch portion 131 is formed at the boundary between the RFID labels 1, in a case where the RFID labels 1 are separated from the RFID label continuous body 102, the notch portion 131 becomes a starting point of the separation. Accordingly, the user can easily separate the RFID labels 1.

In addition, when the notch portion 131 is formed at the boundary between the RFID labels 1, the printer can easily measure the boundary between the RFID labels 1 and a printing region on the RFID label 1 based on the notch portion 131.

As illustrated in FIG. 9, in a case where the notch portion 131 is formed at the position corresponding to the separation portion 110, the notch portion 131 forms a corner cut portion 10c of the RFID label 4 after the RFID label 4 is individually separated from the RFID label continuous body 102.

[Third Modification of RFID Label Continuous Body]

Figure 10:
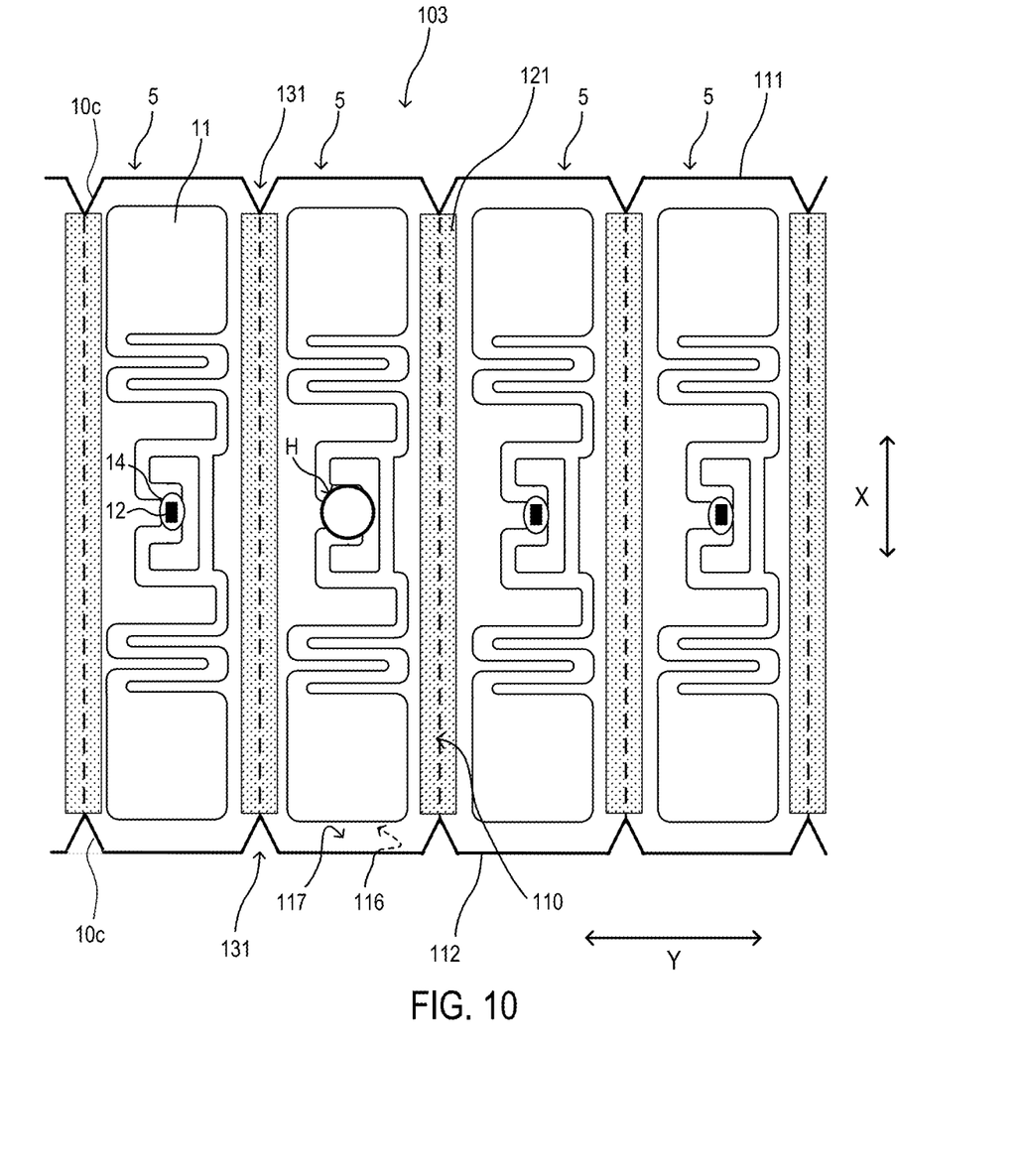
FIG. 10 is a plan view of an RFID label continuous body illustrated as a third modification as viewed from the rear surface side.

FIG. 10 is a plan view of an RFID label continuous body 103 illustrated as a third modification as viewed from the rear surface side.

An RFID label 5 is obtained by separating the RFID label continuous body 103 at the separation portion 110.

The non-adhesive portion 121 and the notch portion 131 described above may be used in combination. That is, on a rear surface of the RFID label continuous body 103, the notch portion 131 is formed at the position corresponding to the separation portion 110, and the non-adhesive portion 121 is formed by silicone coating at a position overlapping the separation portion 110.

Accordingly, even in a case where a plurality of RFID labels 5 are overlapped with each other, since side edges of the RFID labels 5 are not attached, the user can easily lift and peel off the side edges of the RFID labels 5.

Accordingly, it is possible to improve the handleability of the RFID label 5 until the RFID label 5 is separated from the RFID label continuous body 103 and attached to the adherend.

[Configuration of RFID Tag]

Next, an RFID tag 6 used by being attached to an article as an example of the RFID medium will be described.

Figure 11:
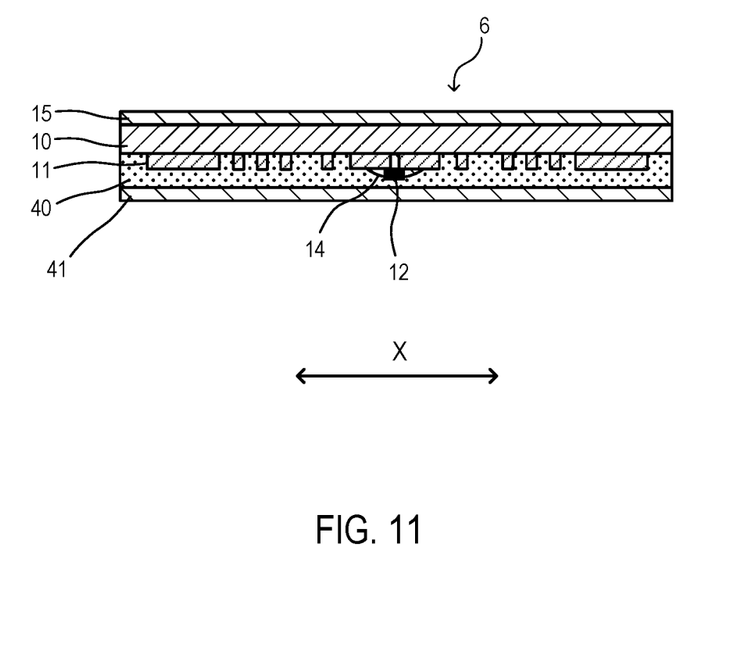
FIG. 11 is a cross-sectional view illustrating an RFID tag according to the present embodiment.

FIG. 11 is a cross-sectional view illustrating the RFID tag 6 according to the present embodiment. The RFID tag 6 includes the base material 10, the antenna 11 formed in a predetermined pattern on one surface of the base material, and the IC chip 12 connected to the antenna 11. In the present embodiment, the antenna 11 and the IC chip 12 are connected to each other by the anisotropic conductive material 14 that is cured by ultraviolet light.

As illustrated in FIG. 11, on the base material 10, the thermosensitive color-developing layer 15 that develops color by heat is formed on a surface opposite to the surface on which the antenna 11 is formed. In the base material 10, a rear surface-side base material 41 is laminated on the surface on which the antenna 11 is formed on an adhesive for lamination 40.

Effects

The RFID tag 6 includes the antenna 11 on the rear surface of the base material 10 provided with the thermosensitive color-developing layer 15, and the antenna 11 and the IC chip 12 are connected to each other by the anisotropic conductive material 14 that is cured by ultraviolet light. That is, the antenna 11 and the IC chip 12 can be directly mounted on the base material 10 provided with the thermosensitive color-developing layer 15 without a heating process.

Therefore, in the manufacturing process of the RFID tag in the related art, there is no need for an RFID inlay which has been manufactured in advance in order to avoid heat transfer to the base material provided with the thermosensitive color-developing layer. Accordingly, a structure of the RFID tag including the base material provided with the thermosensitive color-developing layer can be simplified.

Similar to the RFID label, the RFID tag 6 can be provided as an RFID tag continuous body in which RFID tags are connected to each other.

Other Embodiments

Although the embodiments of the present invention have been described above, the above embodiments are merely a part of application examples of the present invention, and are not intended to limit the technical scope of the present invention to the specific configuration of the above embodiments.

In the present embodiment, the antenna 11 may be printed in a predetermined region of the base material 10 using a conductive ink, in addition to attaching a metal foil to the base material 10.

In the RFID label continuous body 100 illustrated in FIG. 5, the mark 13 may be formed on only one of the side edge portions 111 and 112.

In the RFID label continuous body 102 illustrated in FIG. 9 or the RFID label continuous body 103 illustrated in FIG. 10, the notch portion 131 may be formed in only one of the side edge portions 111 and 112.

In addition, the notch portion 131 can also be formed by cutting out the base material 10 in a process of cutting out a pattern of the antenna 11 by a flexible die formed on the same die roll as a die roll for cutting out the pattern of the antenna 11.

Further, the notch portion 131 may be formed in the base material 10 before the antenna 11 is formed.

A shape of the notch portion 131 is not limited to a triangular shape as illustrated in FIGS. 9 and 10 as long as the notch portion 131 can be detected by a sensor mounted on the printer.

In the present embodiment, the perforation may not be formed at the position corresponding to the separation portion 110.

In the RFID label continuous body 101 illustrated in FIG. 7 or the RFID label continuous body 103 illustrated in FIG. 10, the non-adhesive portion 121 may be a region where the adhesive portion 117 is not formed, instead of the processing for eliminating the adhesiveness of the adhesive portion 117. That is, the rear surface of the base material 10 may be exposed.

In addition, in the RFID label continuous body 101 illustrated in FIG. 7 or the RFID label continuous body 103 illustrated in FIG. 10, only the non-adhesive portion 121 may be formed in the separation portion 110, and the perforation may not be formed therein.

As described above, in a case where perforations are not formed in the RFID label continuous bodies 100, 101, 102, and 103, for example, the RFID labels 1, 3, 4, and 5 are separated from the RFID label continuous bodies 100, 101, 102, and 103 by a cutter or the like provided in the printer.

Each of the plurality of marks 13 may be printed at an interval corresponding to the pitch of the RFID label 4, and is not limited to be printed at the position illustrated in FIG. 5 or FIG. 7.

The thermosensitive color-developing layer 15 may be a recording layer formed of a thermal rewritable recording material capable of developing and erasing color by heat.

The present application claims priority under Japanese Patent Application No. 2021-143958 filed to the Japan Patent Office on Sep. 3, 2021, and the entire content of this application is incorporated herein by reference.

The invention claimed is:

1. An RFID medium, comprising:
  a base material,
  a thermosensitive color-developing layer formed on a front surface of the base material and developed a color by heat,
  an antenna formed on a rear surface of the base material, and
  an IC chip connected to the antenna, wherein
  the antenna and the IC chip are connected to each other by a conductive material that is cured by ultraviolet light.

2. The RFID medium according to claim 1, wherein the base material is paper.

3. The RFID medium according to claim 1, wherein the base material is a resin sheet.

4. The RFID medium according to claim 1, wherein a release layer is formed on a front surface of the thermosensitive color-developing layer.

5. The RFID medium according to claim 4, wherein an adhesive portion for attachment to an adherend is formed on the rear surface of the base material.

6. The RFID medium according to claim 5, wherein the adhesive portion is a tack material having adhesive layers on both surfaces thereof.

7. The RFID medium according to claim 1, wherein a rear surface-side base material is laminated on the rear surface of the base material.

8. An RFID medium continuous body comprising a plurality of the RFID media according to claim 1, wherein respective RFID media are connected to each other on a separation portion.

9. The RFID medium continuous body according to claim 8, wherein
  at least one side edge portion of the RFID medium continuous body is formed with a notch portion cut inward in a width direction of the RFID medium continuous body at an interval corresponding to a pitch of the RFID medium.

10. The RFID medium continuous body according to claim 9, wherein
  the notch portion is formed at a position corresponding to the separation portion.

11. The RFID medium continuous body according to claim 8, wherein
  a region including the IC chip is cut out in some of the RFID media.

12. The RFID medium continuous body according to claim 8, wherein
  the separation portion is a perforation formed along the width direction of the RFID medium continuous body.

13. The RFID medium continuous body according to claim 8, wherein
  an adhesive portion for attachment to an adherend is formed on the rear surface of the base material, and
  the RFID medium continuous body further comprises a non-adhesive portion in a predetermined region including the separation portion.

* * * * *